United States Patent
Hong et al.

(10) Patent No.: US 8,605,105 B2
(45) Date of Patent: Dec. 10, 2013

(54) IMAGE PROCESSING APPARATUS AND METHOD FOR ENHANCING DEPTH PERCEPTION

(75) Inventors: Ji Young Hong, Seongnam-si (KR); Ho Young Lee, Suwon-si (KR); Du Sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 697 days.

(21) Appl. No.: 12/926,010

(22) Filed: Oct. 20, 2010

(65) Prior Publication Data
US 2011/0109620 A1    May 12, 2011

(30) Foreign Application Priority Data
Nov. 12, 2009 (KR) .................. 10-2009-0109153

(51) Int. Cl.
*G09G 5/02* (2006.01)
*G06K 9/00* (2006.01)

(52) U.S. Cl.
USPC ........... 345/589; 345/591; 345/593; 345/604; 382/165

(58) Field of Classification Search
USPC .................. 345/589–605; 382/168–172
See application file for complete search history.

(56) References Cited

U.S. PATENT DOCUMENTS

| | | | |
|---|---|---|---|
| 7,010,163 B1 * | 3/2006 | Weiss | 382/168 |
| 2004/0165769 A1 * | 8/2004 | Huh et al. | 382/162 |
| 2011/0032329 A1 * | 2/2011 | Bauza et al. | 348/43 |

* cited by examiner

*Primary Examiner* — Aaron M Richer
*Assistant Examiner* — Robert Craddock
(74) *Attorney, Agent, or Firm* — Staas & Halsey LLP

(57) ABSTRACT

An image processing apparatus and a method for enhancing depth are disclosed. The image processing apparatus may classify an input image into a foreground layer, a middle layer, a background layer, may calculate a representative color of each of the classified layers, and perform rendering of a color stereoscopy of the middle layer and a color stereoscopy of the background layer based on the representative color and a lightness of the background layer, thereby enhancing a stereoscopic effect and a depth. Also, a color temperature of the foreground layer and a color temperature of the middle layer are controlled based on the representative color and the background layer, to generate a difference in depth between the middle layer and the foreground layer, thereby representing an image having a more enhanced depth.

25 Claims, 11 Drawing Sheets

FIG. 7
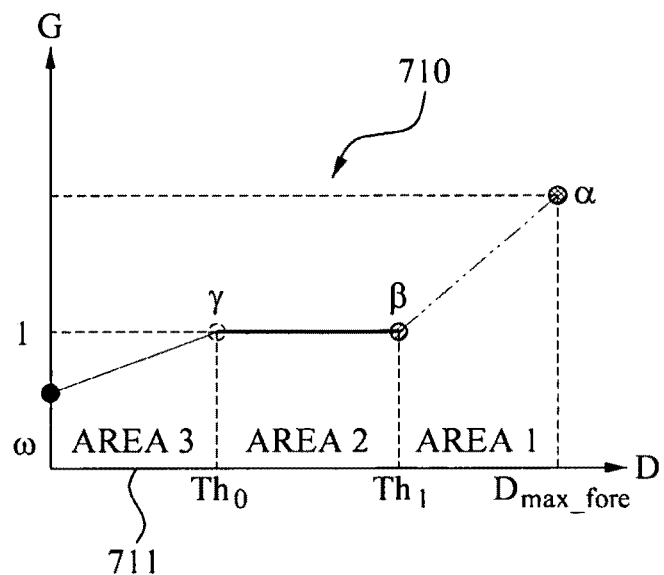
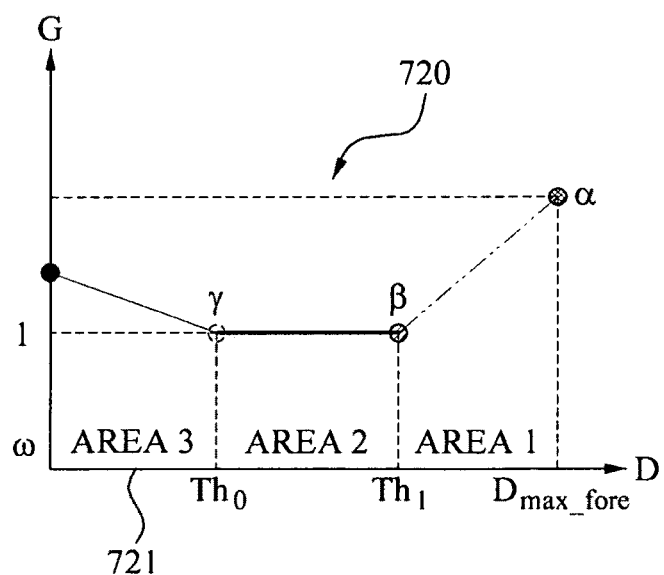

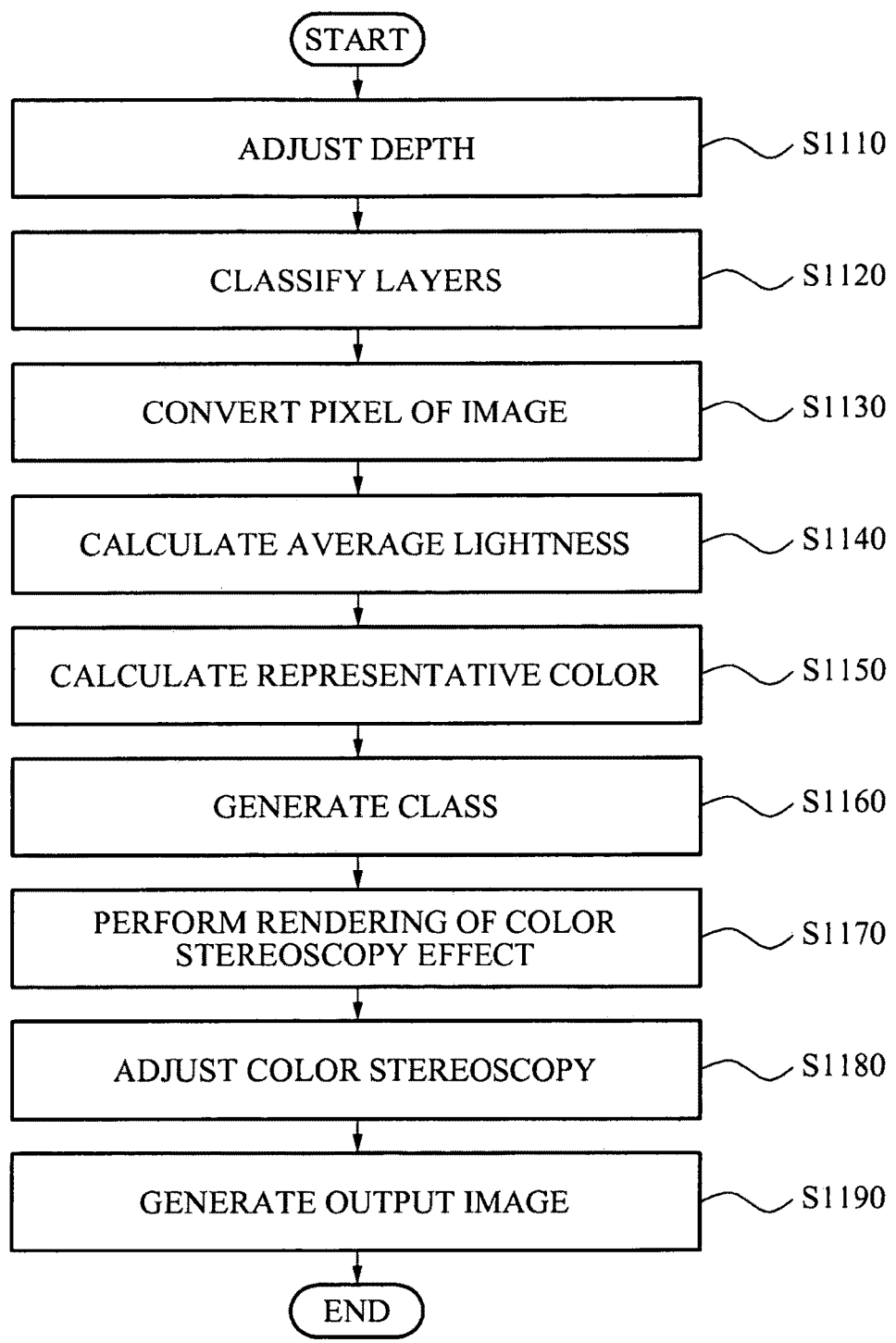

IMAGE PROCESSING APPARATUS AND METHOD FOR ENHANCING DEPTH PERCEPTION

CROSS-REFERENCE TO RELATED APPLICATIONS

This application claims the benefit of Korean Patent Application No. 10-2009-0109153, filed on Nov. 12, 2009, in the Korean Intellectual Property Office, the disclosure of which is incorporated herein by reference.

BACKGROUND

1. Field

The following description relates to an image processing apparatus and method, and more specifically, to an image processing apparatus and method that divides an input image into a plurality of layers and performs rendering on a color stereoscopic image to generate an image having an enhanced stereoscopic effect.

2. Description of the Related Art

A three-dimensional (3D) display that represents a 3D image may directly provide a high sense of realism to a user compared with a two-dimensional (2D) display that only represents a conventional 2D image, and thus, research in this area has been actively conducted.

SUMMARY

Example embodiments of the present disclosure control a color attribute by using a human visual perception in a 3D display and represent an image having an enhanced depth, thereby improving the stereoscopic effect.

According to one or more example embodiments of the present disclosure, an image processing apparatus may be provided. The image processing apparatus may include a multi-layer processing unit to classify an inputted depth image into a foreground layer, a middle layer, and a background layer, a representative color calculator to calculate a representative color of each of the classified layers, a color stereoscopy modeling unit to perform rendering of a color stereoscopy of the middle layer and a color stereoscopy of the background layer based on the representative color and a lightness of the background layer, and a color temperature processing unit to control a color temperature of the foreground layer and a color temperature of the middle layer based on the representative color and the lightness of the background layer.

As an example, the image processing apparatus may receive an image including a depth as the input image. Also, the image processing apparatus may further include a depth adjusting operation unit to adjust a depth by decreasing a disparity between two eyes to reduce a visual fatigue due to the depth.

In this instance, the multi-layer processing unit may classify the input image including the depth, an image of which a depth is intended to be enhanced, or the adjusted depth image into a foreground layer, a middle layer, and a background layer.

The color stereoscopic modeling unit may include a class extracting unit to extract a class generated based on a combination of a representative color of each of the classified layers, and a layer rendering unit to control a lightness and a chroma of the middle layer and a lightness and a chroma of the background layer by using the class and an average lightness of the background layer.

The color temperature processing unit may include an XYZ converting unit to convert a color space of a pixel constituting the classified layers into an RGB color space, and to convert the RGB color space into an XYZ color space, a feature extracting unit to determine whether to move a color temperature of the foreground layer and a color temperature of the middle layer, by using a class generated based on a combination of a representative color of each of the classified layers and the average lightness of the background layer, a color calculator to calculate a coefficient that is a movement range of the color temperature with respect to the foreground layer and the middle layer, when the color temperature moves, a color temperature mapping unit to apply the coefficient to an R value, a G value, and a B value of the foreground layer and to an R value, a G value, and a B value of the middle layer, and an RGB converting unit to convert pixels changed in the temperature mapping unit from X, Y, and Z to R, G, and B.

According to one or more other example embodiments of the present disclosure, a method of processing an image may be provided. The method may include classifying of an inputted depth image into a foreground layer, a middle layer, and a background layer, calculating of a representative color of each of the classified layers, rendering of a color stereoscopy of the middle layer and a color stereoscopy of the background layer based on the representative color and a lightness of the background layer, and controlling of a color temperature of the foreground layer and a color temperature of the middle layer based on the representative color and the lightness of the background layer.

The rendering may performs extracting of a class generated based on a combination of a representative color of each of the classified layers, and controlling of a lightness and a chroma of the middle layer and a lightness and a chroma of the background layer by using the class and an average lightness of the background layer.

The controlling may perform converting of a color space of a pixel constituting the classified layers into a RGB color space, and converting the RGB color space into an XYZ color space, determining of whether to move a color temperature of the foreground layer and a color temperature of the middle layer, by using a class generated based on a combination of a representative color of each of the classified layers and the average lightness of the background layer, calculating of coefficient that is a movement range of the color temperature with respect to the foreground layer and the middle layer, when the color temperature moves, and applying of the coefficient to an R value, a G value, and a B value of the foreground layer and to an R value, a G value, and a B value of the middle layer, and converting of pixels changed in the temperature mapping unit from X, Y, and Z to R, G, and B.

According to one or more other example embodiments of the present disclosure, an image processing apparatus may be provided. The apparatus may include, for example, a multi-layer processing unit to classify an image into a plurality of layers, an average lightness calculator to calculate an average lightness value of a first layer of the classified layers, a representative color calculator to calculate a representative color of each of the classified layers, a color stereoscopy modeling unit to perform rendering on a color stereoscopy of each of the classified layers based on the respective representative color calculated for each of the classified layers by the representative color calculator and further based on the average lightness of the first layer calculated by the average lightness calculator, and a rendering image unit to output a three-dimensional image using the image rendered by the color stereoscopy modeling unit.

According to one or more other example embodiments of the present disclosure, an image processing method may be provided. The method may include the operations of classifying an image into a plurality of layers, calculating an average lightness value of a first layer of the classified layers, calculating a representative color of each of the classified layers, performing rendering on a color stereoscopy of each of the classified layers based on the respective representative color calculated for each of the classified layers and further based on the average lightness calculated for the first layer, and outputting a three-dimensional image using the rendered image.

Other features and aspects will be apparent from the following detailed description, the drawings, and the claims.

BRIEF DESCRIPTION OF THE DRAWINGS

FIG. 7 is a diagram illustrating a result of correcting a color and a chroma based on a class, by a color stereoscopy modeling unit, according to example embodiments;

FIG. 11 is a flowchart illustrating an image processing method according to example embodiment.

Figure 1:
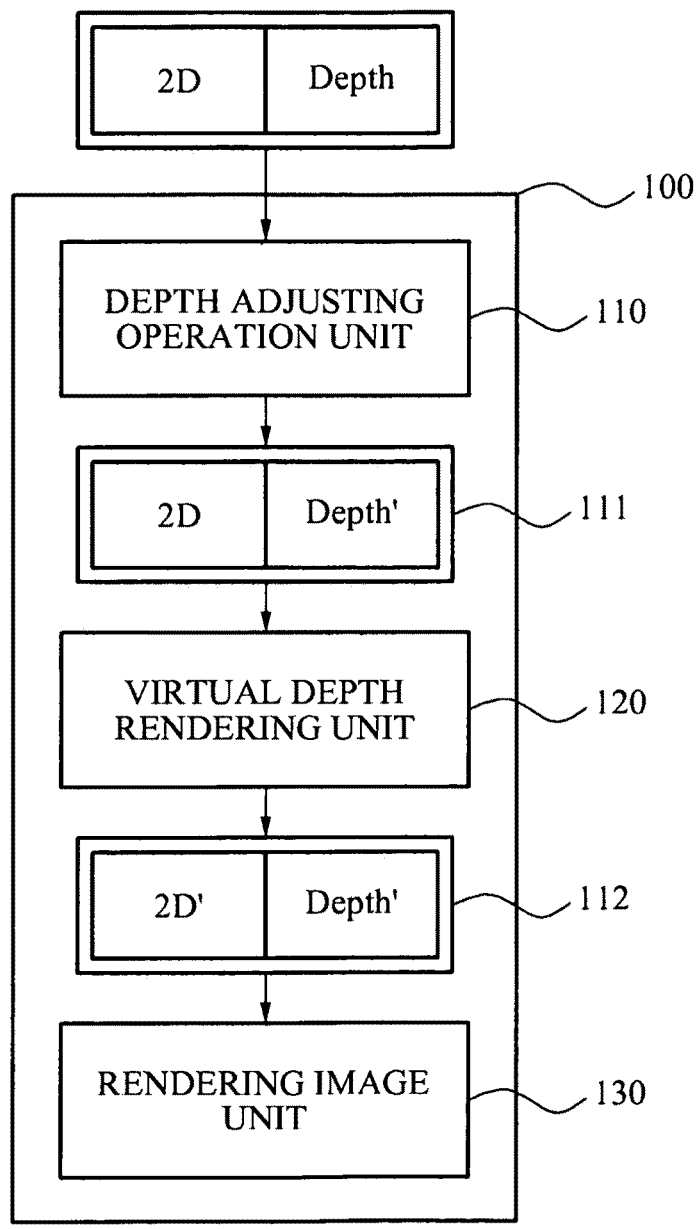
FIG. 1 is a diagram illustrating an operation of an image processing apparatus according to example embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a diagram illustrating an operation of an image processing apparatus 100 according to example embodiments.

Referring to FIG. 1, the image processing apparatus 100 may divide an input image made up of a two-dimensional (2D) image and a depth into a plurality of layers, and may perform rendering of a color stereoscopic image, thereby enhancing a stereoscopic effect.

As an example, a depth adjusting operation unit 110 may adjust a depth of an input image by decreasing a disparity between two eyes to reduce visual fatigue. In this instance, when the depth is adjusted to reduce the visual fatigue, the stereoscopic effect is decreased at the same time as the depth is decreased.

Subsequently, a virtual depth rendering unit 120 may divide a 2D image of the adjusted image 111, of which the depth is adjusted in the depth adjusting operation unit 110, into a plurality of layers, and may generate a rendered image 112 from which a color sterescopic image is rendered. A detailed format and operation of the virtual depth rendering unit 120 will be described in detail with reference to FIG. 2.

A rendering image unit 130 may output an output image appropriate for displaying as a three-dimensional (3D) image by using the rendered image 112.

When the output image is used in a stereoscopic 3D display with polarized glasses, the stereoscopic 3D display with polarized glasses may recognize only the images that are output separately, such as an image for a left eye and an image for a right eye, as the 3D image, and thus, the rendering image unit 130 may generate an image by using a disparity between the left eye and the right eye.

As an example the rendering image unit 130 may generate the output image by applying Equation 1 as given below, to the rendered image 112.

$$\text{Offset} = x - k * \text{Viewing\_distance} * (\text{Depth}(x))$$

$$K = 0.05 * \text{FrameWidth} \qquad \text{Equation 1}$$

In this instance, Viewing_distance is a distance between the stereoscopic 3D display with the polarized glasses and a user of the stereoscopic 3D display with the polarized glasses, Depth is a depth represented in a depth map of the rendered image 112, and FrameWidth is a length of a width of the rendered image 112.

Also, the rendering image unit 130 may use an original RGB pixel value, when the value of an original RGB pixel located in a location of an offset that is calculated based on Equation 1 is an integer number, and the rendering image unit 130 may use an adjacent pixel value by interpolating the adjacent pixel value, when the original RGB pixel value is a real number.

In other words, the image processing apparatus 100 may classify the input image into the plurality of layers based on the depth, and may enhance the stereoscopic effect by performing an adaptive image process based on a feature of each of the classified layers.

Figure 2:
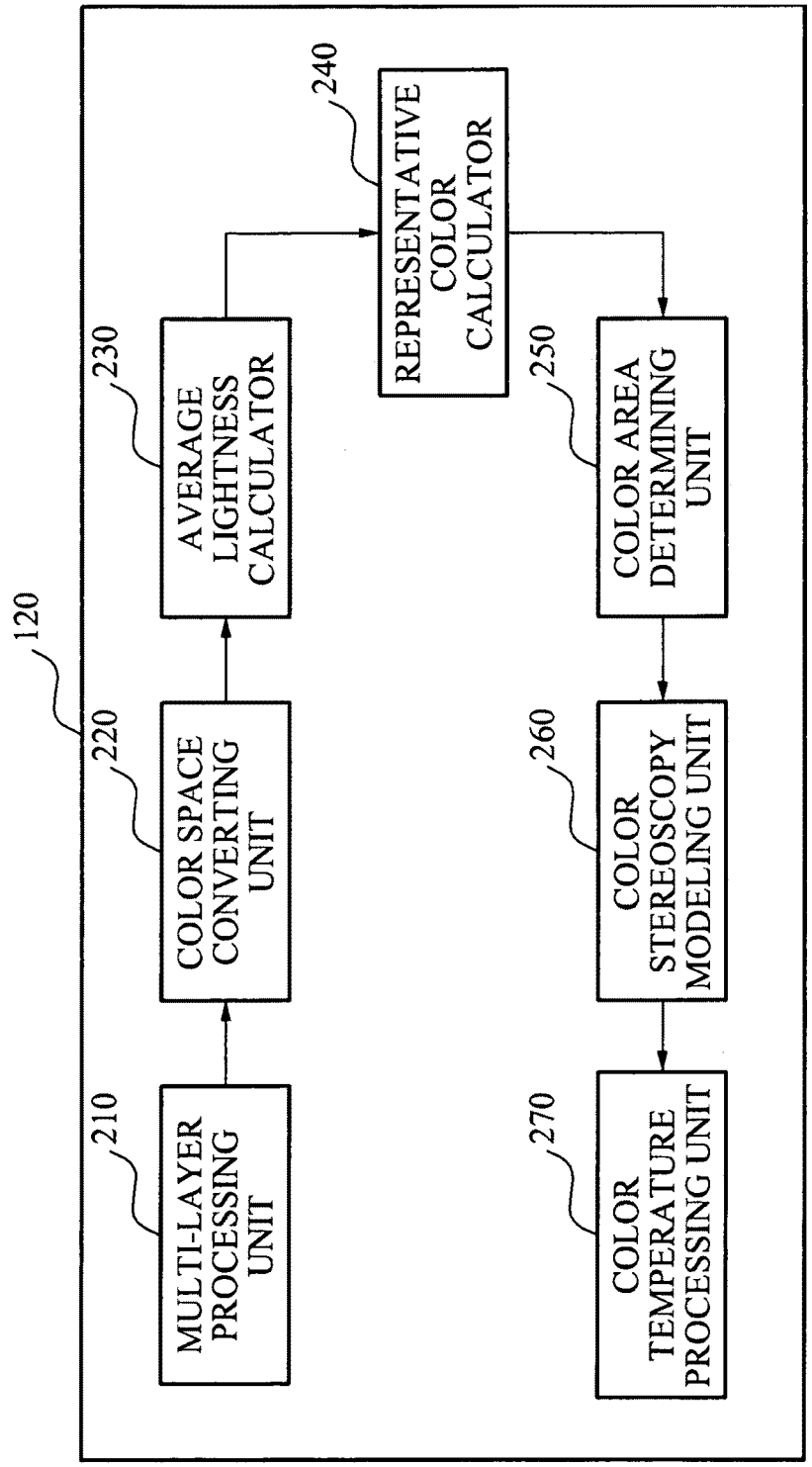
FIG. 2 is a block diagram illustrating a detailed format of a virtual depth rendering unit according to example embodiments.

FIG. 2 is a block diagram illustrating a detailed format of a virtual depth rendering unit according to example embodiments.

Referring to FIG. 2, the virtual depth rendering unit 120 may include, for example, a multi-layer processing unit 210, a color space converting unit 220, an average lightness calculator 230, a representative color calculator 240, a color area determining unit 250, a color stereoscopy modeling unit 260, and a color temperature processing unit 270.

The multi-layer processing unit 210 may perform layering of the adjusted image to include three or more layers based on a depth. In this instance, the multi-layer processing unit 210 may classify the layered layers into a foreground layer, a middle layer, a background layer, based on the depth.

Figure 3:
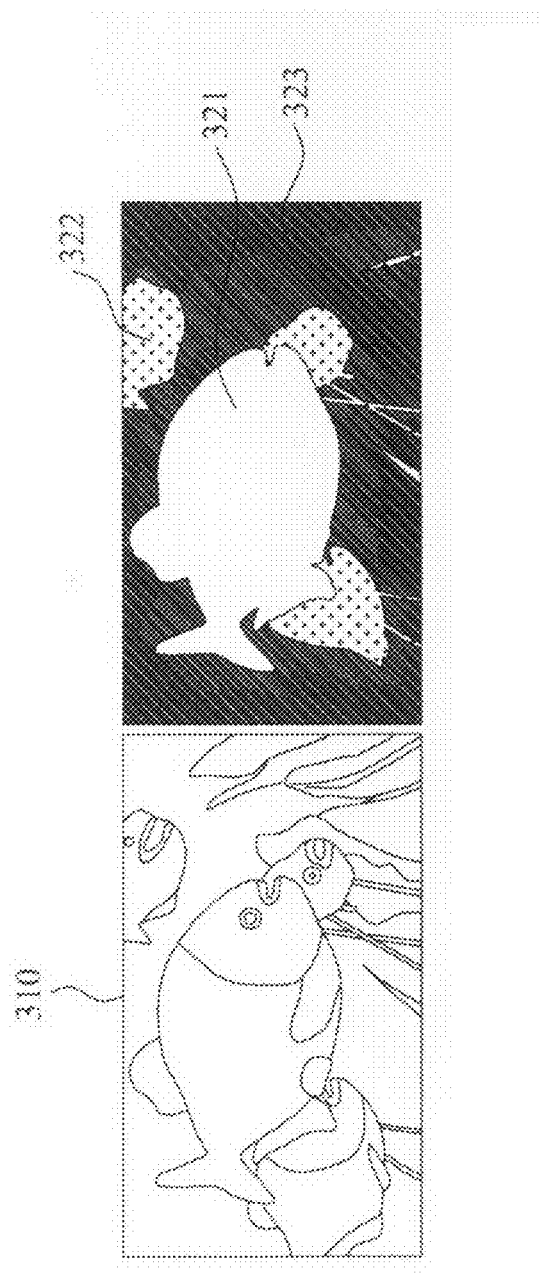
FIG. 3 is a diagram illustrating that a multi-layer processing unit classifies layers based on a depth according to example embodiments.

Referring to FIG. 3, as an example, the multi-layer processing unit 210 may divide, based on a depth, an input image 310 input into the virtual depth rendering unit 120 into a foreground layer 321 that is in a front, a background layer 323 that is in a back, and a middle layer 322 that is between the foreground layer 321 and the background layer 323. In an embodiment, the foreground layer 321 and the middle layer 322 may each include a plurality of layers.

The color space converting unit 220 may convert an RGB color space used by a pixel, of a plurality of pixels, constituting the layers classified in the multi-layer processing unit 210 into a lightness, a chroma, and a hue quadrature.

In this instance, the color space used by the pixel of the classified layers is an RGB digital signal and is not related to a visual system of a human, and thus, the color space converting unit 220 may convert the RGB color space into a color space that is represented by the visual system of a human, namely, the color space being represented using human perceptual features, such as a luminance, a chroma, and a hue.

The multi-layer processing unit 210 may convert the RGB color space into one of a variety of color spaces that support the luminance, the chroma, and the hue.

As an example, a CIECAM02 color space is used when a color appearance is intended to be accurately predicted, an LCH color space, which is based on CIELAB, is used when a difference in a color or a difference in an image is evaluated, and an HSV color space is used when the use is a color design and a simple industrial application.

The multi-layer processing unit 210 may use different abbreviations for the luminance, the chroma, and the hue based on each color space, as shown in Table 1 below. The present example embodiment will describe a case using CIECAM02, and J, C, and H indicate the luminance, the chroma, and the hue, respectively.

TABLE 1

| Colour Space | Lightness | Chroma | Hue |
|---|---|---|---|
| CIECAM02 | Lightness(J) | Choma(C) | Hue(H) |
| LCH | Lightness(L) | Choma(C) | Hue(H) |
| HSV | Brightness(B or V) | Saturation(S) | Hue(H) |

The average lightness calculator 230 may calculate an average lightness value of a layer classified as a background layer by the multi-layer processing unit 210.

In this instance, the average lightness calculator 230 may calculate the average lightness value of the background layer by using J that corresponds to a luminance among values converted in the color space converting unit 220.

The representative color calculator 240 may calculate a representative color of each of the classified layers classified in the multi-layer processing unit 210.

Particularly, the representative color calculator 240 may calculate a color indicated by a wavelength band having a highest number of pixels that constitute each of the classified layers, as a representative color of a corresponding layer.

The representative color calculator 240 may calculate a representative color value using various methods, and as an example, the representative color calculator 240 may set, by using a color band of CIECAM02, a color indicated by a frequency having a highest number of input pixels of a corresponding layer, as the representative color.

In CIECAM02, a color may be roughly classified into four areas, and the representative color calculator 240 may classify the color based on a wavelength band, and may set a red range representing a long wavelength as 0 to 61 and 270 to 360, may set a green range representing a neutral color as 61 to 184, and may set a blue range representing a short wavelength as 185 to 269. In this instance, a setting value that determines each wavelength band may be changed according to a display feature, and may not include the neutral color excluding a long wavelength and a short wavelength.

The color area determining unit 250 may generate a class to determine a color area by combining a representative color calculated by the representative color calculator 240.

Figure 4:
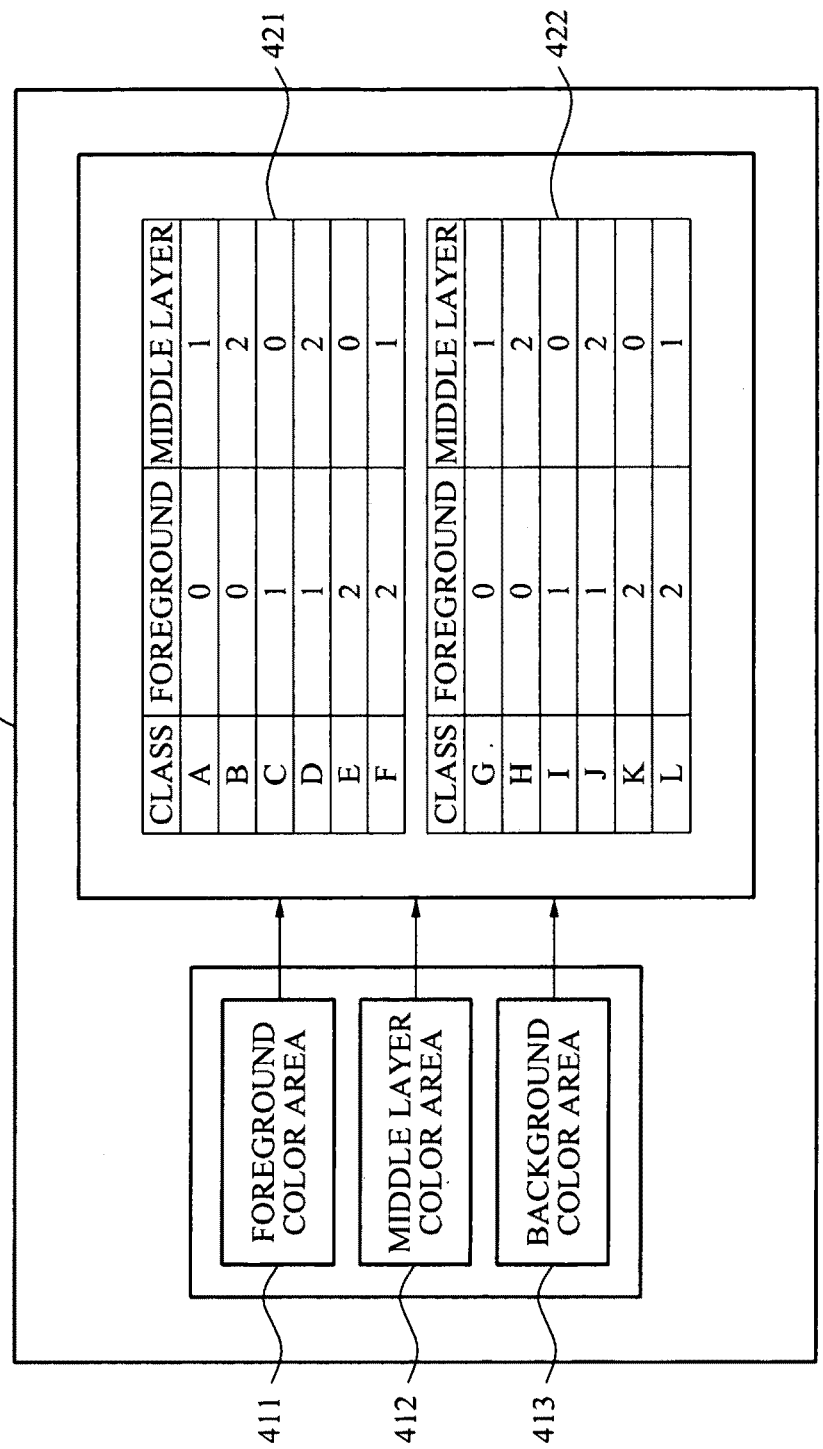
FIG. 4 is a diagram illustrating that a color area determining unit generates a class according to example embodiments.

Referring to FIG. 4, as an example, the color area determining unit 250 may generate a class 421 as given in Table 2 by combining a representative color 411 of a foreground layer and a representative color 412 of a middle layer, and may generate a class 422 as given in Table 3 by combining the representative color 411 of the foreground layer and a representative color 413 of a background layer.

TABLE 2

| Class | Foreground | Middle Layer |
|---|---|---|
| A | 0 | 1 |
| B | 0 | 2 |
| C | 1 | 0 |
| D | 1 | 2 |
| E | 2 | 0 |
| F | 2 | 1 |

TABLE 3

| Class | Foreground | Middle Layer |
|---|---|---|
| G | 0 | 1 |
| H | 0 | 2 |
| I | 1 | 0 |
| J | 1 | 2 |
| K | 2 | 0 |
| L | 2 | 1 |

In this instance, a number represented in each layer indicates a color area. "0" may be a long wavelength range included in a red area, "1" may be a neutral color range included in a green area, and "2" may be a blue range, which is a short wavelength. Accordingly, referring to Table 2, the foreground layer is red area and the middle layer is blue area in class B.

The color stereoscopy modeling unit 260 may perform rendering of a color stereoscopy of the foreground layer, a color stereoscopy of the middle layer, and a color stereoscopy of the background layer, based on the representative color calculated by the representative color calculator 240 and the lightness of the background layer calculated by the average lightness calculator 230.

Figure 5:
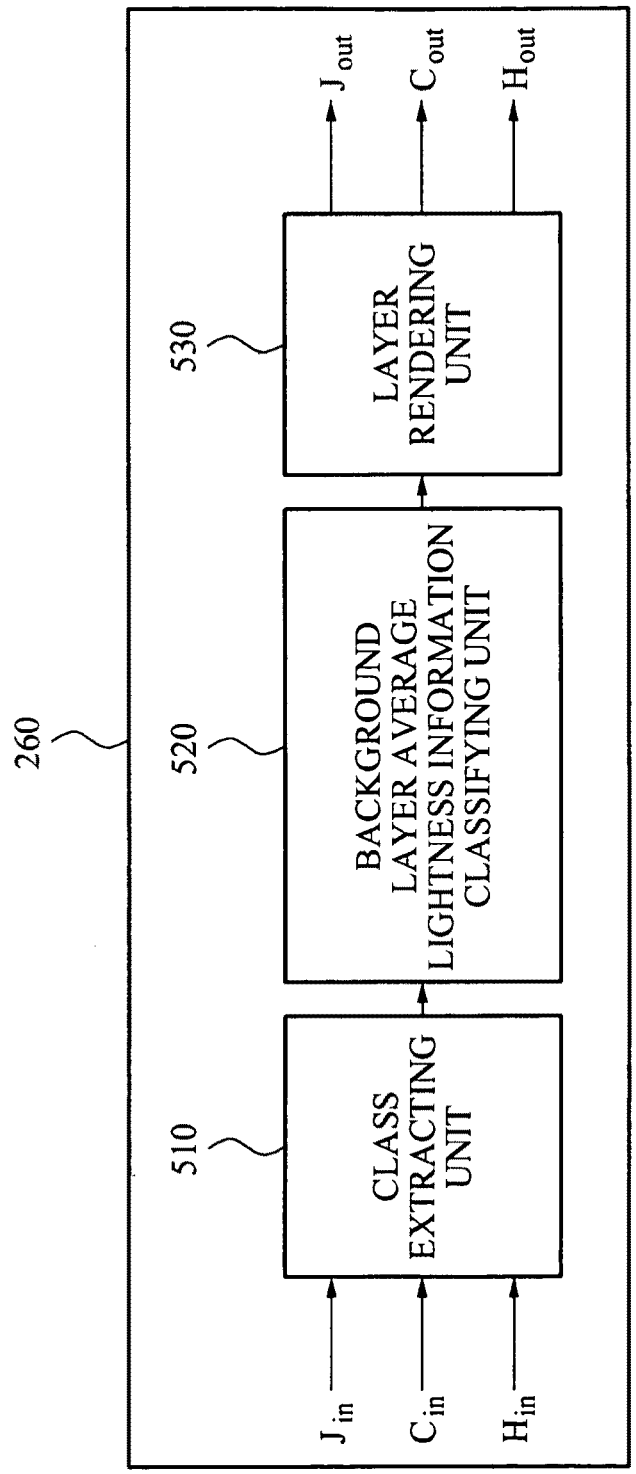
FIG. 5 is a block diagram illustrating a detailed format of a color stereoscopy according to example embodiments.

In this instance, the color stereoscopy modeling unit 260 may include, for example, a class extracting unit 510, a lightness information storing unit 520, and a layer rendering unit 530, as illustrated in FIG. 5.

First, the class extracting unit 510 may extract the class generated based on the combination of the representative color of each of the layers from among classes generated by the color area determining unit 250.

Next, the lightness information storing unit 520 may load, from the average lightness calculator 230, the average lightness value that is calculated by the average lightness calculator 230, and may temporarily store the average lightness value.

In this instance, the lightness information storing unit 520 may classify loaded background lightness into three categories, e.g., areas, based on a degree of lightness and may store the classified background lightness. As an example, the background lightness, namely, a J value of CIECAM02, may be classified into three areas, such as 0 to 30, 31 to 60, and 61 to 100, and may be used for controlling the color stereoscopy and a color stereoscopy reversion.

The layer rendering unit 530 may control a lightness and a chroma of the foreground layer, a lightness and a chroma of the middle layer, and a lightness and a chroma of the background layer, by using the class extracted by the class extracting unit 510 and the average lightness value of the background layer stored in the lightness information storing unit 520. In this instance, the layer rendering unit 530 may load the average lightness value of the background layer from the average lightness calculating unit 230.

In this instance, the layer rendering unit 530 may control the lightness and the chroma of the foreground layer, the lightness and the chroma of the middle layer, and the lightness and the chroma of the background layer, using Equation 2 as given below.

$$L_{out} = G \times L_{in} \quad \text{Equation 2}$$

In this instance, $L_{in}$ is a pixel inputted to the layer rendering unit 530, $L_{out}$ is a pixel that is controlled by the layer rendering unit 530, and G is a predetermined gain selected based on the class and the average lightness value. A method of calculating of the G for each layer will be described with reference to FIGS. 3 through 5.

Also, the layer rendering unit 530 may adaptively perform a gradation mapping by using a lightness J and a chroma C based on a depth.

$$G = \frac{\alpha - \beta}{D_{max\_fore} - Th_1} * (D_{in} - Th_1) + \beta \quad \text{Equation 3}$$

$$G = \frac{\beta - \gamma}{Th_1 - Th_0} * (D_{in} - Th_0) + \gamma \quad \text{Equation 4}$$

$$G = \frac{\gamma - \omega}{Th_0} * D_{in} + \omega \quad \text{Equation 5}$$

Figure 6:
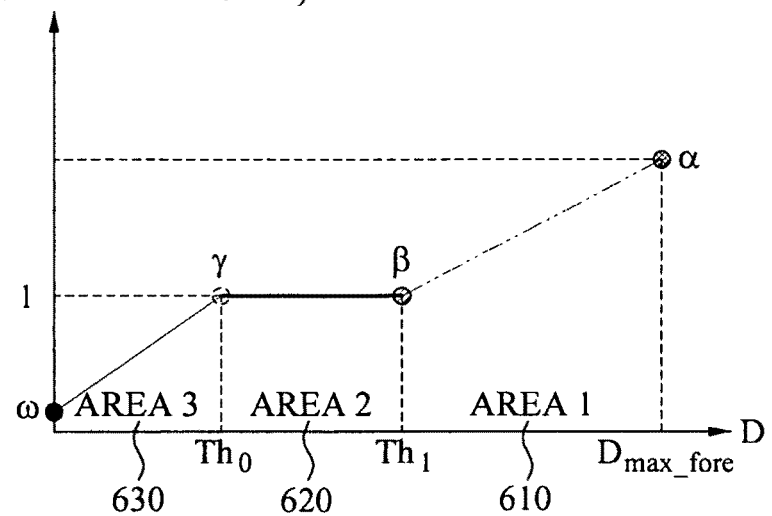
FIG. 6 is a diagram illustrating a result of rendering a color and a chroma by a color stereoscopy modeling unit according to example embodiments.

As illustrated in FIG. 6, in association with above equations, Dmax_fore is a maximum depth of a foreground layer 610, Th1 is a depth threshold that separates the foreground layer 610 and a middle layer 620, and Th0 is a depth threshold that separates the middle layer 620 and a background layer 630.

In this instance, the layer rendering unit 530 may control a lightness J and a chroma C of the foreground layer by using and α and β as illustrated in Equation 3, may control a lightness J and a chroma C of the middle layer by using β and γ as illustrated in Equation 4, and may control a lightness J and a chroma C of the background layer by using γ and ω as illustrated in FIG. 5.

The layer rendering unit 530 may control a value calculated by Equation 2 through Equation 5 based on a combination of a representative color of each layer, and may output $L_{out}$.

First, the class extracting unit 510 may control the lightness J and chroma C of the middle layer when the classes extracted by the class extracting unit 510 are from A to F.

Particularly, the layer rendering unit 530 may control a lightness and a chroma included in a corresponding category by using Table 4 in which an average lightness of the background is classified into three categories.

In this instance, "0" is BYPASS indicating to output an input pixel as is without performing any process, "+" indicates an increase of the lightness J and the chroma C, and "−" indicates a decrease of the lightness J and the chroma C.

TABLE 4

| Class | BG Lightness (0~30) | | BG Lightness (31~60) | | BG Lightness (61~100) | |
|---|---|---|---|---|---|---|
| | Lightness | Chroma | Lightness | Chroma | Lightness | Chroma |
| A | − | − | 0 | 0 | + | + |
| B | 0 | 0 | − | 0 | 0 | 0 |
| C | + | 0 | − | + | 0 | + |
| D | 0 | 0 | 0 | 0 | − | 0 |
| E | + | 0 | + | 0 | − | − |
| F | + | 0 | + | − | + | + |

When the classes extracted by the class extracting unit 510 are from G to L, the layer rendering unit 530 may control the lightness J and the chroma C of the background layer by using Table 5.

TABLE 5

| Class | BG Lightness (0~30) | | BG Lightness (31~60) | | BG Lightness (61~100) | |
|---|---|---|---|---|---|---|
| | Lightness | Chroma | Lightness | Chroma | Lightness | Chroma |
| G | − | − | 0 | 0 | + | + |
| H | 0 | 0 | − | 0 | 0 | 0 |
| I | + | 0 | − | + | 0 | + |
| J | 0 | 0 | 0 | 0 | − | 0 |
| K | + | 0 | + | 0 | − | − |
| L | + | 0 | + | − | + | + |

As an example, a combination of the color of the foreground layer and the color of the middle layer may be class "B", and a combination of the color of the middle layer and the color of the background layer may be class "F", when a background lightness of Lin is 50, a representative color of the foreground layer is a red area, which is a long wavelength, a representative color of the middle layer is a blue area, which is a short wavelength, and a representative color of the background layer is a green area that is a neutral color. In this instance, referring to Table 4, all the middle layers indicate BYPASS, and the background layer has a lightness of "+" and has a chroma of "−".

Accordingly, the layer rendering unit 530 may process the lightness of the middle layer and the lightness of the background layer 711 as illustrated in graph 710 of FIG. 7, and may process the chroma of the middle layer and the chroma of the background layer 721 as illustrated in graph 720 of FIG. 7.

The layer rendering unit 530 may apply a predetermined gain to the foreground layer without changing the lightness or the chroma, and may output Lout of the foreground.

Figure 8:
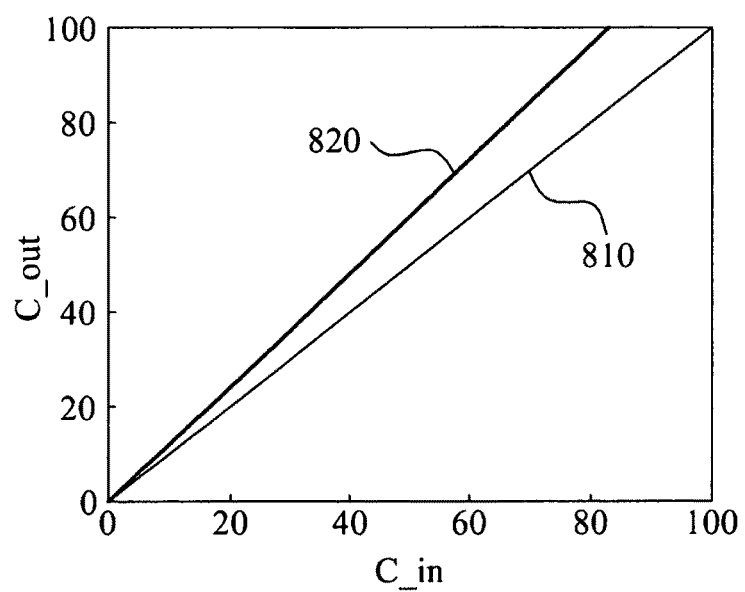
FIG. 8 is a diagram illustrating a change in a foreground layer in a color stereoscopy modeling unit according to example embodiments.

As an example, as illustrated in FIG. 8, Lin 810 of the foreground layer may increase by a same amount as a gain calculated according to Equation 3, thereby being Lout 820 of the foreground layer.

That is, the color stereoscopy modeling unit 260 may process the middle layer and the background layer by using the color stereoscopy feature and reversion.

The color temperature processing unit 270 may control a color temperature of the foreground layer and a color temperature of the middle layer based on the representative color and the lightness of the background layer. In this instance, the color temperature processing unit 270 may not change the color temperature of the background layer and may only use an average lightness value of the background layer.

Figure 9:
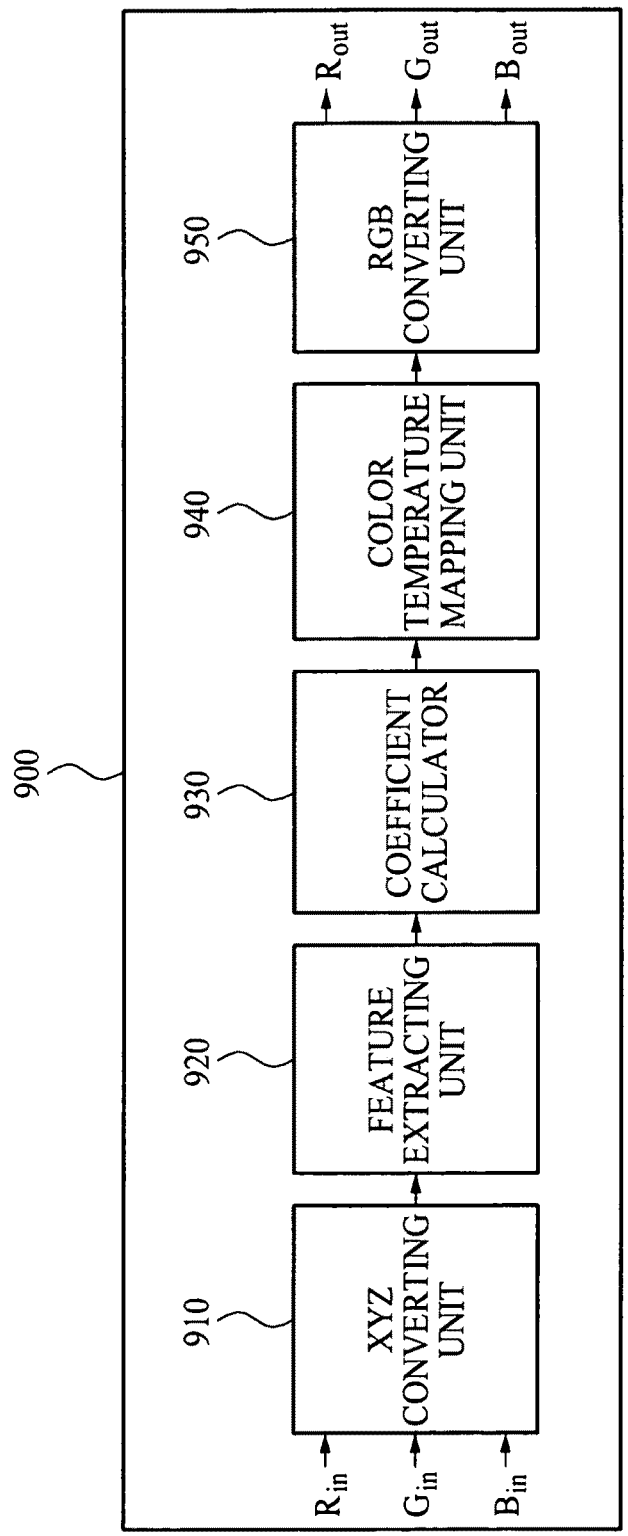
FIG. 9 is a block diagram illustrating a detailed format of a color temperature processing unit according example embodiments.

Referring to FIG. 9, in an embodiment, the color temperature processing unit 270 may include an XYZ converting unit 910, a feature extracting unit 920, a coefficient calculator 930, a color temperature mapping unit 940, and an RGB converting unit 950.

The XYZ converting unit 910 may convert a color space of a pixel, of a plurality of pixels, constituting layers into an RGB color space, and may convert the converted RGB color space into an XYZ color space. In this instance, the XYZ converting unit 910 may store J, C, and H values from before the conversion to the XYZ color space, in a memory.

Figure 10:
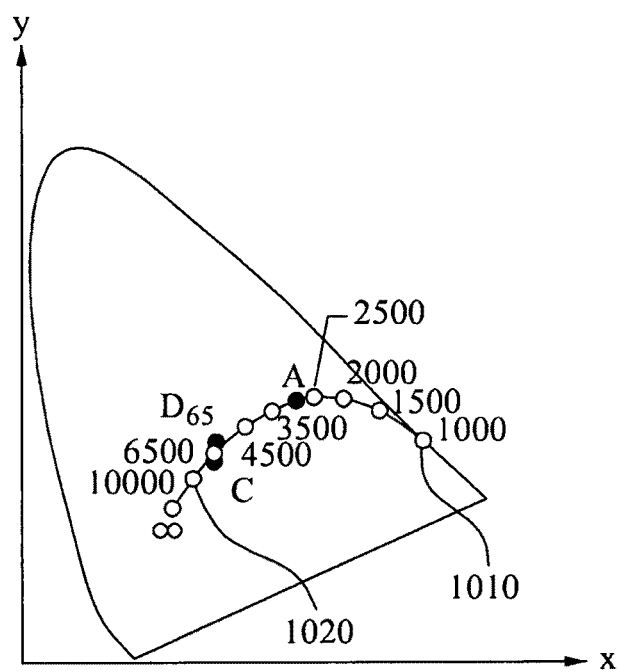
FIG. 10 is a diagram illustrating a color graph.

Referring to FIG. 10, the feature extracting unit 920 may determine whether to move a color temperature of the foreground layer and a color temperature of the middle layer, by using the class generated based on a combination of the representative color of each of the layers and the average brightness value of the background layer. In this instance, the color temperature indicates a change in a light based on a temperature difference, and the color temperature is marked by using a Kelvin value indicating an absolute temperature. The color temperature is closer to a red light 1010 as the value is lower, and is closer to a blue light 1020 as the value is higher. Accordingly, the color temperature is represented as a cool color when a value of the color temperature is low, and the color temperature is represented as a warm color when the value of the color temperature is high.

In this instance, the feature extracting unit 920 may move the color temperature of the foreground layer to a long wavelength range when the average lightness value of the background layer is greater than or equal to a predetermined value, and may move the color temperature of the foreground layer to a short wavelength range when the average lightness value of the background layer is less than the predetermined value.

Also, the feature extracting unit 920 may move the color temperature of the middle layer in a direction opposite to the direction in which the color temperature of the foreground layer moves. As an example, when the foreground layer moves to the long wavelength range, the middle layer may move to the short wavelength range.

Particularly, the feature extracting unit 920 may use a class generated based on a combination of a representative color of the foreground layer and a representative color of the middle layer to determine the representative color combination of the foreground layer and the middle layer, and may determine the average lightness value of the background layer calculated by the average lightness calculator 230 to combine with the representative color of the foreground layer and the middle layer.

In this instance, when the average lightness value of the background layer, the average lightness value being to be combined, is less than a predetermined value, the feature extracting unit 920 may determine the background layer as black, and may move the color temperature of the foreground layer to a direction of warm, which is the long wavelength range. Also, when the average lightness value of the background layer, the average lightness value being to be combined, is greater than or equal to the predetermined value, the feature extracting unit 920 may determine the background layer as white, and may move the color temperature of the foreground layer to a direction of cool, which is the short wavelength range, by using a conventional color stereoscopy reversion.

The feature extracting unit 920 may move the color temperature of the middle layer using Table 6 as given below.

TABLE 6

| Class | BG Lightness(0~30) | | BG Lightness(31~100) | |
| --- | --- | --- | --- | --- |
| | Foreground | Middle | Foreground | Middle |
| A | W | C | C | W |
| B | W | C | C | 0 |
| C | W | 0 | C | W |
| D | W | C | C | 0 |
| E | W | 0 | C | W |
| F | W | C | C | W |

In this instance, "W" indicates that the color temperature is moved to the warm direction, "C" indicates that the color temperature is moved to the cool direction, and "0" indicates that the color temperature is not changed. In an embodiment, "0" may occur only in the middle layer.

As an example, when a color of the long wavelength range is selected as a representative color of the middle layer, a lightness and a chroma of the color of the long wavelength range is controlled by the color stereoscopy modeling unit 260, and thus, a degradation of an image quality may occur when the color of the long wavelength range is moved to a cooler color temperature. Accordingly, the feature extracting unit 920 may set a corresponding middle layer as "0" and may not change a color temperature of the color of the long wavelength range.

The feature extracting unit 920 may change a white balance of the foreground layer and the middle layer to be reversed from each other to generate a depth between layers, thereby representing an image having an enhanced depth.

The coefficient calculating unit 930 may calculate a coefficient that is a movement range of the color temperature with respect to the foreground layer and the middle layer, when the color temperature is moved.

In this instance, the coefficient is an R coefficient, a G coefficient, and a B coefficient, and the coefficient calculator 930 may calculate the coefficient on the assumption that the image is displayed in a device having D65, since a white balance of a general TV is set to 6500K to 7100K.

An operation of the coefficient calculator 930 will be described in detail based on a case of when the color temperature is moved from 6500K to 5000K.

First, the coefficient calculator 930 may normalize x and y values for each temperature, and may calculate an X value, a Y value, and a Z value as given in Table 7 and Table 8.

TABLE 7

| | x | y | Xn | Yn | Zn | X | Y | Z |
| --- | --- | --- | --- | --- | --- | --- | --- | --- |
| White | 0.3457 | 0.3585 | 0.9643 | 1.0000 | 0.8251 | 0.9643 | 1.0000 | 0.8251 |
| R | 0.6400 | 0.3300 | 1.9394 | 1.0000 | 0.0909 | 0.4852 | 0.2502 | 0.0227 |
| G | 0.3000 | 0.6000 | 0.5000 | 1.0000 | 0.1667 | 0.3489 | 0.6977 | 0.1163 |
| B | 0.1500 | 0.0600 | 2.5000 | 1.0000 | 13.1667 | 0.1303 | 0.0521 | 0.6861 |

TABLE 8

|  | x | y | Xn | Yn | Zn | X | Y | Z |
| --- | --- | --- | --- | --- | --- | --- | --- | --- |
| White | 0.3127 | 0.3290 | 0.9505 | 1.0000 | 1.0891 | 0.9505 | 1.0000 | 1.0891 |
| R | 0.6400 | 0.3300 | 1.9394 | 1.0000 | 0.0909 | 0.4124 | 0.2126 | 0.0193 |
| G | 0.3000 | 0.6000 | 0.5000 | 1.0000 | 0.1667 | 0.3576 | 0.7152 | 0.1192 |
| B | 0.1500 | 0.0600 | 2.5000 | 1.0000 | 13.1667 | 0.1805 | 0.0722 | 0.9505 |

Table 7 is an example of an X value, a Y value, and a Z value when the color temperature is changed into 5000K. Table 8 is an example of an X, a Y, and a Z values when the color temperature is changed into 6500K.

Next, the coefficient calculator 930 may change the normalized values as given in Table 7 into an X value, a Y value, and a Z value, and a Y ratio may be calculated based on each of R, G, and B. As an example, in Table 7, 0.2502, 0.6977, and 0.0521 may be the Y ratio based on R, G, and B, respectively.

Next, the coefficient calculator 930 may determine a Y ratio, based on when the color temperature is a basic color temperature, 6500K, and may normalize, to a value corresponding to R, a value of the result of dividing a Y ratio at 5000K by a Y ratio at 6500K to know an amount of change in the R coefficient, the G coefficient, and the B coefficient to be needed, thereby calculating the R coefficient, the G coefficient, and the B coefficient.

The color temperature mapping unit 940 may apply a coefficient calculated by the coefficient calculator 930 to an R value, a G value, and a B value of the foreground layer and to an R value, a G value, and a B value of the middle layer.

Particularly, the color temperature mapping unit 940 may multiply each of the R value, the G value, and the B value of the foreground layer and each of the R value, the G value, and the B value of the middle layer by the coefficient, and may input the multiplied values to the RGB converting unit 950.

The RGB converting unit 950 may convert a color space of a pixel from an X, Y, and Z to an R, G, and B, again, the color space being changed in the color temperature mapping unit 950.

The color temperature processing unit 270 may apply, based on lightness of the background layer, a color stereoscopy and a color stereoscopy reversion when the color temperature adjustment is performed, thereby changing a color temperature of a foreground layer which is to be recognized as a most stereoscopic layer.

Also, the color temperature processing unit 270 may change a color temperature of a middle layer of which a color attribute is controlled by the color stereoscopy modeling unit 260 based on the color stereoscopy feature, to generate a depth difference between foreground layers, thereby representing an image having an enhanced depth.

FIG. 11 is a flowchart illustrating an image processing method according to an example embodiment.

The depth adjusting operation unit 110 may adjust a depth of an input image by decreasing a disparity between two eyes to reduce a visual fatigue due to the depth, in operation S1110.

The multi-layer processing unit 210 may classify the adjusted image of S1110 into a foreground layer, a middle layer, and a background layer in operation S1120.

The color converting unit 220 may convert an RGB color space used by a pixel of the classified layers of S1120 into a lightness, a chroma, and a hue quadrature in operation S1130. In this instance, the color space used by the pixel of the classified layers classified by the multi-layer processing unit 210 is an RGB digital signal and is not related to a visual system of a human, and thus, the color space converting unit 220 may convert the RGB color space into a color space that better represents the human visual system, namely, a color space that uses human perceptual features, such as a luminance, a chroma, and a hue.

The average lightness calculator 230 may calculate an average lightness value of a layer that is classified, in operation S1120, as a background layer, in operation S1140. In this instance, the average lightness calculator 230 may calculate the average lightness value of the background layer by using J, corresponding to a luminance among values converted by the color space converting unit 220

The representative color calculator 240 may calculate a representative color of each of the classified layers in operation S1120, in operation S1150. Particularly, the representative color calculator 240 may calculate a color indicated by a wavelength band having a highest number of pixels that constitute each of the classified layers, as a representative color of a corresponding layer.

The color area determining unit 250 may generate a class to determine a color area by combining the representative color calculated in operation S1150, in operation S1160.

The color stereoscopy modeling unit 260 may perform rendering of a color stereoscopy of the middle layer and a color stereoscopy of the background layer, based on the calculated representative color of operation S1150 and the calculated lightness of the background layer of operation S1140, in operation S1170.

Particularly, the color stereoscopy modeling unit 260 may extract a class generated by a combination of a representative color of each of layers among generated classes of operation S1160, and may control the lightness and the chroma of the middle layer and the lightness and the chroma of the background layer by using the extracted class and the calculated average lightness value of background layer of operation S1140.

In this instance, the color stereoscopy modeling unit 260 may apply a predetermined gain to the foreground layer without changing the lightness or the chroma, thereby changing an output value of the foreground layer into a linear function.

The color temperature processing unit 270 may control a color temperature of the foreground layer and a color temperature of the middle layer based on the calculated representative color of operation S1150 and the calculated lightness of the background layer of operation S1140, and may adjust the rendered color stereoscopy of operation S1170, in operation S1180.

Particularly, the color temperature processing unit 270 may convert a color space of a pixel constituting layers into an RGB color space, may convert the converted RGB color space into an XYZ color space again, and may determine whether to move the color temperature of the foreground layer and the color temperature of the middle layer by using the class generated by the combination of the representative color of each of the layers and the average lightness value of the background layer.

Next, the color temperature processing unit 270 may calculate a coefficient that is a movement range of the color temperature with respect to the foreground layer and the middle layer, when the color temperature is moved, may apply the calculated coefficient to an R value, a G value, and a B value of the foreground layer and to an R value, a G value, and a B value of the middle layer, and may convert, again, the color space of the pixels, where the coefficient is applied, from X, Y, and Z to R, G, and B.

The rendering image unit 130 may output an output image appropriate for displaying as a 3D image, by using the adjusted image of which the color stereoscopy is adjusted in operation S1180, in operation S1190.

Descriptions which are omitted in the description of FIG. 11 may be understood based on the descriptions with reference to FIGS. 1 through 10.

The methods and/or operations described above including a method of processing an image may be recorded, stored, or fixed in one or more computer-readable storage media that include program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts.

Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter.

The described hardware devices may be configured to act as one or more software modules in order to perform the operations and methods described above, or vice versa. The instructions may be executed on any processor, general purpose computer, or special purpose computer such as an image processing apparatus. Further, the software modules may be controlled by any processor. In addition, a computer-readable storage medium may be distributed among computer systems connected through a network and computer-readable codes or program instructions may be stored and executed in a decentralized manner.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing apparatus comprising:
   a multi-layer processing unit to classify an inputted depth image into a foreground layer, a middle layer, and a background layer;
   a representative color calculator to calculate a representative color of each of the classified layers;
   a color stereoscopy modeling unit to perform rendering of a color stereoscopy of the middle layer and a color stereoscopy of the background layer based on the representative color and a lightness of the background layer;
   a color temperature processing unit to control a color temperature of the foreground layer and a color temperature of the middle layer based on the representative color and the lightness of the background layer; and
   a rendering image unit to output a three-dimensional image using the image rendered by the color stereoscopy modeling unit.

2. The apparatus of claim 1, further comprising:
   a depth adjusting operation unit to adjust a depth of the image by decreasing a disparity between two eyes to reduce visual fatigue due to the depth.

3. The apparatus of claim 1, wherein the representative color calculator calculates the representative color by converting a pixel constituting the classified layers into a color space constituted of a lightness, a chroma, and a hue.

4. The apparatus of claim 1, wherein the representative color calculator calculates a color indicated by a wavelength band having a highest number of pixels that constitute each of the classified layers, as the representative color.

5. The apparatus of claim 1, wherein the color stereoscopic modeling unit comprises:
   a class extracting unit to extract a class generated based on a combination of a representative color of each of the classified layers; and
   a layer rendering unit to control a lightness and a chroma of the middle layer and a lightness and a chroma of the background layer by using the class and an average lightness of the background layer.

6. The apparatus of claim 1, wherein the color temperature processing unit comprises:
   an XYZ converting unit to convert a color space of a pixel constituting the classified layers into an RGB color space, and to convert the RGB color space into an XYZ color space;
   a feature extracting unit to determine whether to move a color temperature of the foreground layer and a color temperature of the middle layer, by using a class generated based on a combination of a representative color of each of the classified layers and the average lightness of the background layer;
   a coefficient calculator to calculate a coefficient that is a movement range of the color temperature with respect to the foreground layer and the middle layer, when the color temperature moves;
   a color temperature mapping unit to apply the coefficient to an R value, a G value, and a B value of the foreground layer and to an R value, a G value, and a B value of the middle layer; and
   an RGB converting unit to convert pixels changed in the temperature mapping unit from X, Y, and Z to R, G, and B.

7. The apparatus of claim 6, wherein the feature extracting unit performs:
   moving of the color temperature of the foreground layer to a first wavelength range, when an average lightness value of the background layer is greater than or equal to a predetermined value; and
   moving of the color temperature of the foreground layer to a second wavelength range, when the average lightness value of the background layer is less than the predetermined value,
   wherein the first wavelength range and the second wavelength range are different.

8. A method of processing an image, the method comprising:
   classifying of an inputted depth image into a foreground layer, a middle layer, and a background layer;
   calculating a representative color of each of the classified layers;

rendering of a color stereoscopy of the middle layer and a color stereoscopy of the background layer based on the representative color and a lightness of the background layer;

controlling of a color temperature of the foreground layer and a color temperature of the middle layer based on the representative color and the lightness of the background layer; and outputting a three-dimensional image using the rendered image.

9. The method of claim 8, further comprising:
adjusting of a depth by decreasing a disparity between two eyes to reduce a visual fatigue due to the depth.

10. The method of claim 8, wherein the calculating calculates the representative color by converting a pixel constituting the classified layers into a color space constituted of a lightness, a chroma, and a hue.

11. The method of claim 8, wherein the calculating calculates a color indicated by a wavelength band having a highest number of pixels that constitute each of the classified layers, as the representative color.

12. The method of claim 8, wherein the rendering performs:
extracting of a class generated based on a combination of a representative color of each of the classified layers; and
controlling of a lightness and a chroma of the middle layer and a lightness and a chroma of the background layer by using the class and an average lightness of the background layer.

13. The method of claim 8, wherein the controlling performs:
converting of a color space of a pixel constituting the classified layers into a RGB color space, and converting the RGB color space into an XYZ color space;
determining of whether to move a color temperature of the foreground layer and a color temperature of the middle layer, by using a class generated based on a combination of a representative color of each of the classified layers and the average lightness of the background layer;
calculating of coefficient that is a movement range of the color temperature with respect to the foreground layer and the middle layer, when the color temperature moves;
applying of the coefficient to an R value, a G value, and a B value of the foreground layer and to an R value, a G value, and a B value of the middle layer; and
converting of pixels changed in the temperature mapping unit from X, Y, and Z to R, G, and B.

14. The method of claim 13, wherein the determining performs:
moving of the color temperature of the foreground layer to a first wavelength range, when an average lightness of the background layer is greater than equal to a predetermined value; and
moving of the color temperature of the foreground layer to a second wavelength range when the average lightness of the background layer is less than the predetermined value,
wherein the first wavelength range and the second wavelength range are different.

15. A non-transitory computer readable recording media storing a program implementing the method of claim 8.

16. An image processing apparatus, the apparatus comprising:
a multi-layer processing unit to classify an image into a plurality of layers;
an average lightness calculator to calculate an average lightness value of a first layer of the classified layers;

a representative color calculator to calculate a representative color of each of the classified layers;
a color stereoscopy modeling unit to perform rendering on a color stereoscopy of each of the classified layers based on the respective representative color calculated for each of the classified layers by the representative color calculator and further based on the average lightness of the first layer calculated by the average lightness calculator; and
a rendering image unit to output a three-dimensional image using the image rendered by the color stereoscopy modeling unit.

17. The apparatus of claim 1, further comprising:
a depth adjusting operation unit to adjust a depth of the image by decreasing a disparity between two eyes to reduce visual fatigue due to the depth,
wherein the multi-layer processing unit classifies the adjusted depth image into a foreground layer, a middle layer, and a background layer and the average lightness calculator calculates an average lightness value of the background layer.

18. The apparatus of claim 17, further comprising a color temperature processing unit to control a color temperature of the foreground layer and a color temperature of the middle layer based on the calculated representative color of each of the classified layers and the calculated average lightness of the background layer, and to adjust the rendered image based on the controlled color temperature of the foreground layer and the middle layer.

19. The apparatus of claim 18, wherein the color temperature processing unit converts a color space of a pixel constituting a layer of the plurality of layers into a first color space, converts the converted first color space into a second color space, and determines whether to move the color temperature of the foreground layer and the color temperature of the middle layer using the class generated by the combination of the representative color of each of the layers and the calculated average lightness value of the background layer.

20. The apparatus of claim 1, further comprising a color space converting unit to convert an RGB color space used by a pixel constituting a layer of the plurality of layers classified in the multi-layer processing unit into a lightness, a chroma, and a hue quadrature.

21. An image processing method comprising:
classifying an image into a plurality of layers;
calculating an average lightness value of a first layer of the classified layers;
calculating a representative color of each of the classified layers;
performing rendering on a color stereoscopy of each of the classified layers based on the respective representative color calculated for each of the classified layers and further based on the average lightness calculated for the first layer; and
outputting a three-dimensional image using the rendered image.

22. The method of claim 21, further comprising:
adjusting a depth of the image by decreasing a disparity between two eyes to reduce visual fatigue due to the depth,
wherein the adjusted depth image is classified into a foreground layer, a middle layer, and a background layer and an average lightness value of the background layer is calculated.

23. The method of claim 22, further comprising:
controlling a color temperature of the foreground layer and a color temperature of the middle layer based on the calculated representative color of each of the classified layers and the calculated average lightness of the background layer; and adjusting the rendered image based on the controlled color temperature of the foreground layer and the middle layer.

24. The method of claim 23, wherein:

a color space of a pixel constituting a layer of the plurality of layers is converted into a first color space;

the converted first color space is converted into a second color space; and it is determined whether to move the color temperature of the foreground layer and the color temperature of the middle layer using the class generated by the combination of the representative color of each of the layers and the calculated average lightness value of the background layer.

25. The method of claim 21, further comprising:

converting an RGB color space used by a pixel constituting a layer of the plurality of classified layers into a lightness, a chroma, and a hue quadrature.

* * * * *